United States Patent [19]
Gallet et al.

[11] Patent Number: 5,721,944
[45] Date of Patent: Feb. 24, 1998

[54] METHOD AND SYSTEM FOR IMPLEMENTING RELATIVE TIME DISCRIMINATIONS IN A HIGH SPEED DATA TRANSMISSION NETWORK

[75] Inventors: Georges Gallet, Tourrettes Sur Loup; Jean Marie Munier, Cagnes Sur Mer; Andre Pauporte, La Colle Sur Loup; Victor Spagnol, Cagnes Sur Mer, all of France

[73] Assignee: International Business Machines Corporation, Armonk, N.Y.

[21] Appl. No.: 498,133

[22] Filed: Jul. 5, 1995

[30] Foreign Application Priority Data

Aug. 7, 1994 [EP] European Pat. Off. .............. 94480059

[51] Int. Cl.$^6$ .............. G06F 1/06; G06F 7/02; G06F 9/305
[52] U.S. Cl. .............. 395/800; 364/715.04; 364/715.1; 395/557
[58] Field of Search .............. 395/515.8, 2.2, 395/551, 185.08, 185.06, 297, 552, 304, 555, 494, 557, 421.01, 560, 421.09, 421.1, 559, 846, 871, 899, 515, 800; 365/15.38; 364/748, 715.04, DIG. 1, DIG. 2, 715.1; 327/114, 172, 294; 235/462; 371/40.1

[56] References Cited

U.S. PATENT DOCUMENTS

| | | | |
|---|---|---|---|
| 3,971,005 | 7/1976 | Bulrer | 365/15 |
| 4,623,846 | 11/1986 | LaMarchia | 327/114 |
| 4,905,178 | 2/1990 | Mor et al. | 364/748 |
| 5,157,655 | 10/1992 | Hamlin, Jr. et al. | 370/545 |

FOREIGN PATENT DOCUMENTS 5252192  9/1993  Japan.

OTHER PUBLICATIONS

IEEE Journal of Solid-Stae Circuits, vol. 27, No. 11, Nov. 1992, New York US pp. 1634–1643 H.J. Chao et al. 'A VLSI Sequencer Chip for ATM Traffic Shaper and Queue Manager'.

*Primary Examiner*—Daniel H. Pan

[57] ABSTRACT

A data transmission network congestion control mechanism requires knowledge of the sequence of occurrence of two dates d1 and d2, respectively defined by times t1 and t2 provided by a wraparound timer as respective numbers A and B coded in a 2's-complement form. Relative date discrimination is implemented by dividing the wraparound timer period into four consecutive intervals, each defined by the two most significant bits of the timer count. The value of the most significant bits and the sign of A−B, are used to derive a one-bit "X" indicator, the binary value of which indicates which of the two dates d1 and d2 was first to occur.

2 Claims, 8 Drawing Sheets

METHOD AND SYSTEM FOR IMPLEMENTING RELATIVE TIME DISCRIMINATIONS IN A HIGH SPEED DATA TRANSMISSION NETWORK

FIELD OF THE INVENTION

This invention deals with high-speed data transmission networks and more particularly with a method and system for implementing relative time discriminations to support congestion control in a high speed packet switching environment.

BACKGROUND OF THE INVENTION

In the 1970's IBM introduced the Systems Network Architecture (SNA) as the blueprint for the future design of telecommunication networks. SNA evolved into a robust, layered communications architecture that provides for hierarchical communication among a diverse group of communication products. SNA is the networking architecture underlying a considerable number of data communications networks that, in many cases, are used by large customers running major applications on large mainframes.

Future computing environments are expected to be characterized by distributed processing among peer platforms. Such environments are also expected to take advantage of high bandwidth now available. In the 70's and early 80's, line speeds of 9.6 kbps (and lower) and 64 kbps pipes were typical. During the 80s, T-1 connections (1.5 Mbps) saw widespread use with T-3 (45 Mbps) service becoming available in the late 80's. Local Area Networks (LAN) segments operating at 10-100 Mbps are available and backbone networks are evolving to support such LAN traffic.

The line speeds which have been achieved are only the beginning of what technology is expected to offer in the 90s and beyond.

Millions of miles of optical fiber have been installed in the U.S. with more being added daily. Potential bandwidths of 400+ Mbps are available in some locations today and 2.4 Gbps will be available using Synchronous Optical Network (SONET) transmission technology.

Distributed computing applications must be supported across high-speed backbones that may be carrying LAN traffic, voice, video, and traffic among channel-attached hosts, business workstations, engineering workstations, terminals, and small to intermediate file servers. This traffic will reflect a heterogeneous mix of end-user network protocols. New challenges must be met by future networks.

One of those challenges is to minimize the processing time within each node while managing full network congestion control to meet user requirements accepted by the network on a case by case basis.

A network congestion control system must be able to discriminate between time events which are logged only as a count in a free-running timer; more specifically, a free-running wraparound binary counter acting as a timer.

SUMMARY OF THE INVENTION

The present invention is a method for implementing relative time discrimination to detect the older of the two events (d1 and d2), respectively defined by individual time values (t1 and t2) provided by a free running wraparound counter acting as a timer. The events occur within a single timer period. The timer period is divided into four consecutive adjacent intervals, the intervals being defined by the two most significant bits of the timer value, 10, 11, 00 and 01, respectively. Logical operations are performed using the two most significant bits of binary numbers A and B expressing t1 and t2 values respectively. The output of the logical operations is a binary "x" indicator, the value of which indicates which of the two events (d1 and d2) occurred earlier. Further characteristics and advantages of the invention will become more apparent from the following detailed description of a preferred embodiment of the invention, when considered with reference to the accompanying drawings.

DETAILED DESCRIPTION OF PREFERRED EMBODIMENT OF THE INVENTION

Figure 1:
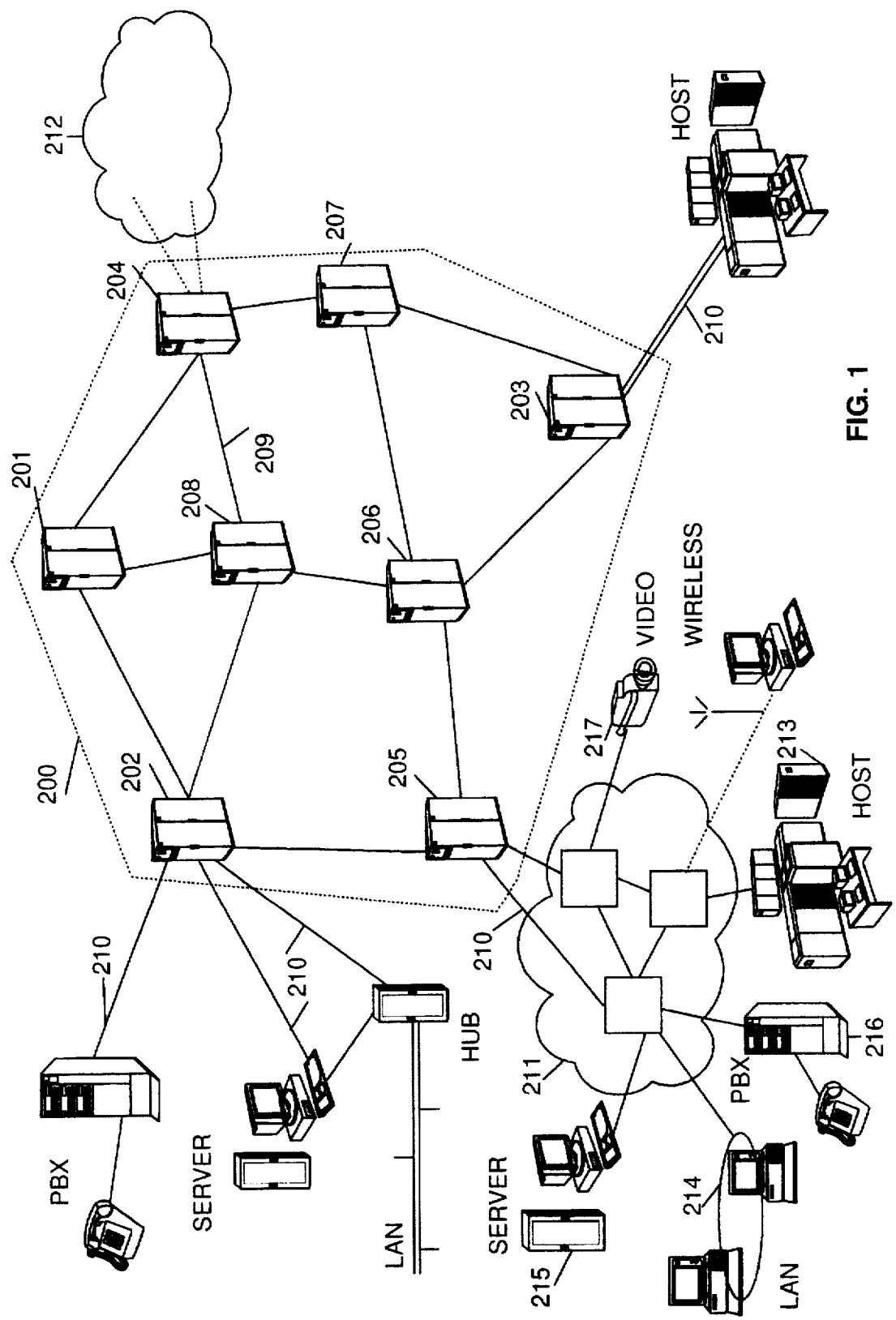
FIG. 1 is a schematic representation of a modern communication system.

As illustrated in FIG. 1, a typical communication system can have several user networks (212) communicating through a high performance network (200) using private lines, carrier provided services, or public data networks. Each user network can be described as a set of communications processors and links (211) interconnecting large computers used as Enterprise Servers (213), user groups using workstations or personal computers attached on a LAN (214) ,application servers (215) private Branch exchanges (PBX) (216) or video servers (217. User networks, dispersed in different establishments, must be interconnected through wide area transport facilities. Different approaches can be used for organizing the data transfers. Some architectures require checking for data integrity at each network node, thus slowing down the transmission. Other architectures utilize transmission, routing and switching techniques within the nodes which are optimized to provide source-to-destination data transfers at the highest possible rate. The present invention is used in a network architecture falling within the latter category; specifically, a fast packet switching network architecture.

The network 200 in FIG. 1 is a fast packet switching transmission system comprising eight nodes (201 to 208), each node being interconnected by means of high speed communication lines called trunks (209). User access (210) to the high speed network 200 is realized through access nodes (202 to 205) located at the periphery. These access nodes have one or more ports, each one providing an access point for attaching external devices to the network. The access nodes perform the conversions required to transport the users' data flow across the network from and to other external devices. As an example, the access node (202) has interfaces to a Private Branch exchange, an application server and a hub through three ports, and communicates through the network by means of the adjacent nodes (201, 208 and 205).

Each network node (201 to 208) includes a Routing Point where the incoming data packets are selectively routed on outgoing trunks towards neighboring nodes. Routing decisions are made according to information contained in the header of the data packets and based on predefined data transport conditions.

A fundamental challenge for high-speed networking is minimizing the processing time within each node in the network. The architecture must minimize both the awareness and the function of intermediate (or transit) nodes in the network. Hop-by-hop flow control and error recovery are eliminated at intermediate nodes, at least for the demanding high-bandwidth applications. Thus, congestion and flow control should be provided at the end-points of network connections.

Logically, a network architecture can be divided into three parts: network control, transport services and access services. Only network control function, and specifically the included congestion control are addressed by this invention and shall be described herein.

Congestion control addresses the making and enforcing of bandwidth reservation agreements with provision for burstiness of user's traffic, as well as estimating actual bandwidth and adjusting reservations as necessary.

The basic mechanism for network congestion control is a so-called "leaky bucket" mechanism. User traffic can be thought of as being dumped into buckets at the edges of a network and being allowed to enter the network through faucets or leaky buckets that enforce an agreed-to admission flow (i.e. reservation level) into the network. The user's reservation level is a fundamental parameter for enabling network traffic optimization.

The basic preventive congestion control strategy assumes a leaky bucket operating at the source of each origin-destination pair of a pipe, with the following objectives:

To remain transparent to the user, as much as possible, as long as the user traffic parameters are within negotiated values.

To limit the user traffic entering the network to the negotiated bandwidth.

Figure 2:
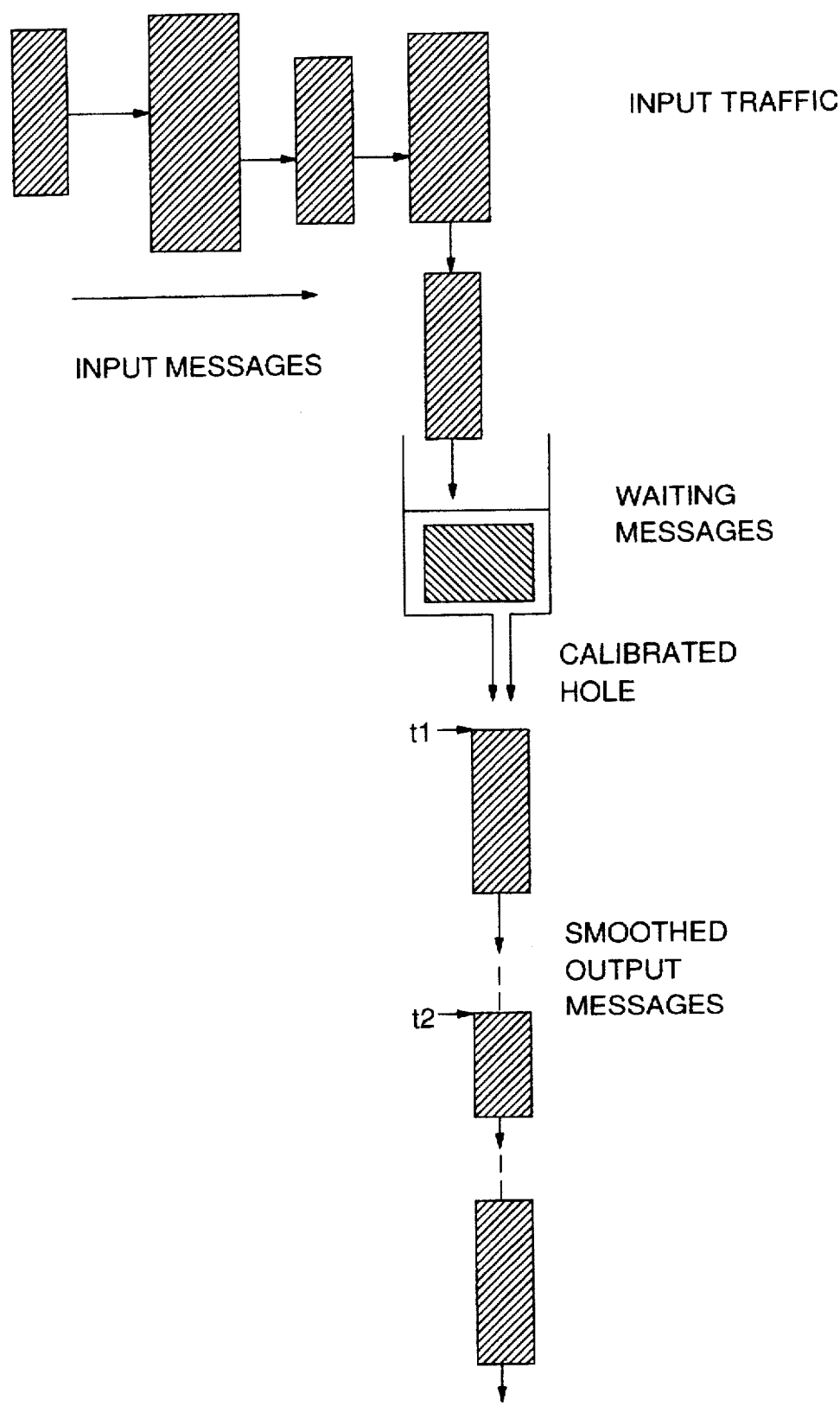
FIG. 2 illustrates a leaky bucket network admission control operation.

Leaky bucket operation is represented in simplified form in FIG. 2. Each message received on a line can be thought of as being poured into a bucket. There is one bucket for each user (virtual connection). The messages are of different sizes and randomly received, as schematically represented by blocks of data of different sizes ocurring randomly over time. The bucket output "leaks" into the network smoothly to take into consideration the level of network bandwidth reserved by the user. In other words, the bucket is a buffer which is used to suppress peaks in received traffic while keeping the output rate at a predefined value. The "leaked" blocks are distributed in both size and time of distribution.

Several situations may occur. If a bucket is "empty" the incoming message may be admitted directly into the network without buffering. If a bucket is "full", the current message would be discarded. Finally, the bucket may be neither empty nor full. In this case, the current message would be transmitted only after all messages already in the bucket are transmitted, and the user receives a transmit authorization, which may take the form of credits or tokens "held" by the user.

To that end, for each user, several parameters are kept in memory, including:

Reserved bandwidth in bytes per second.
Time of last message received.
Credit after last message has been sent.
Time when the user's bucket would be empty.

Figure 3:
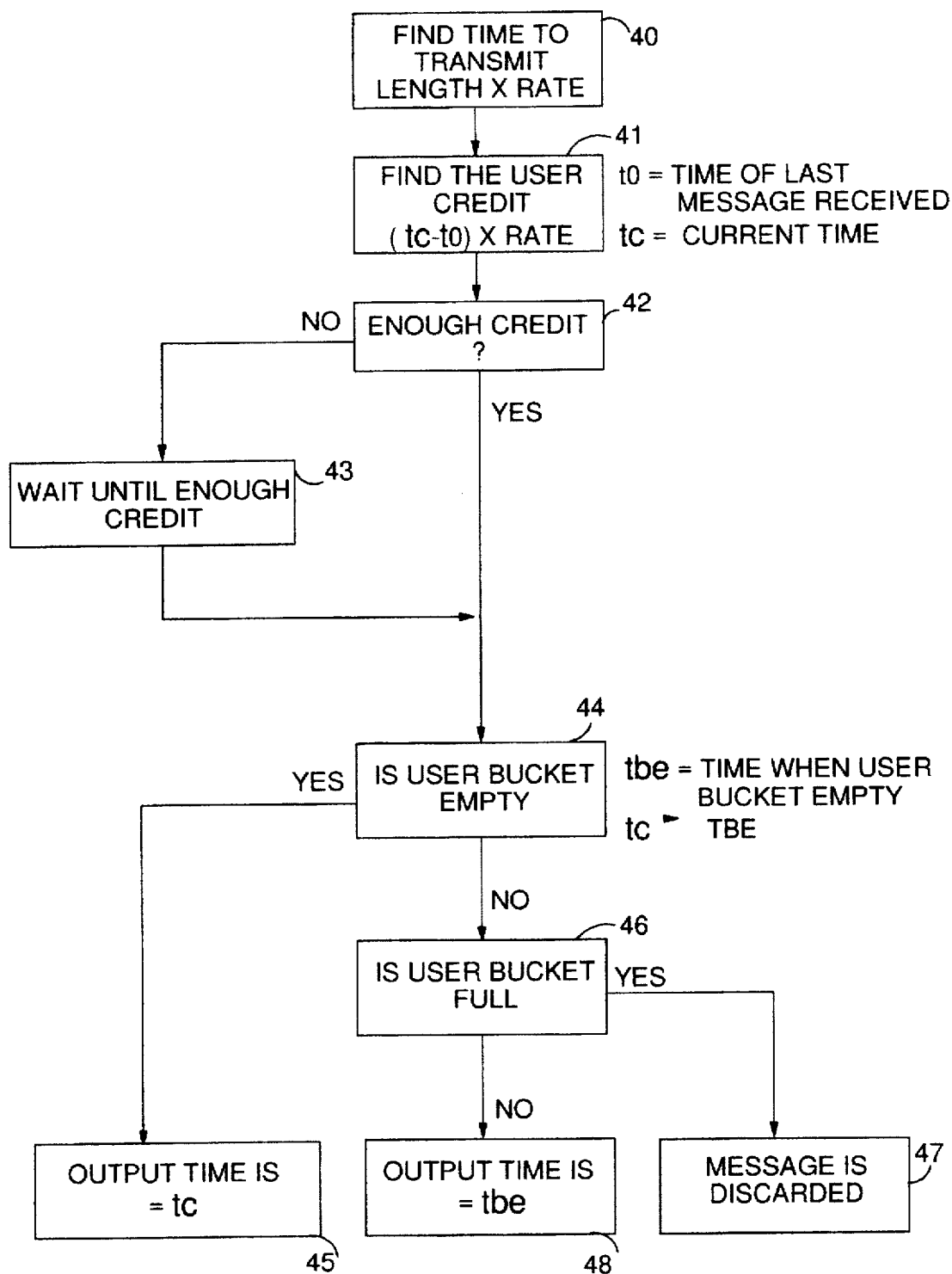
FIG. 3 is a simplified flow-chart of leaky bucket admission control operation.

Represented in FIG. 3 is a simplified flow chart of the leaky bucket process. Once a user's message is received, the system starts with determining how long it would take to transmit this message by considering the message length and the user's assigned rate (step 40). Then the system computes the current user credit by considering the time of last message received (t0), the current time (tc) and the user assigned rate. A test of the user's current credit is then performed (step 42). If the user credit is greater than time required to ransmit the current message, the message processing goes on; therwise the system waits until enough credit is obtained by the user (step 43). A test is then performed to detect whether the user bucket is empty (step 44). If it is, the current message is admitted into the network (step 45). Otherwise, a test is performed to detect whether the bucket is full (step 46).

If the bucket is full, the message is discarded (step 47); otherwise, the time when user bucket will be empty (tbe) is computed and the current message is time stamped for admission to the network at that time (step 48).

It will be noted that the process involves use of relative timer values. A general problem occurs when "dates" of events must be compared to each other if those events are not timestamped with a non-recurring dating method (such as "year, month, day, hour, minute, second, millisecond, etc. . ."), but are simply marked as a current value of a free-running timer. In effect, an easy way of marking events (e.g. message timings) consists in using a free-running binary counter or timer, the maximum count of which is large as compared to the difference of the dates to be compared.

Figure 5:
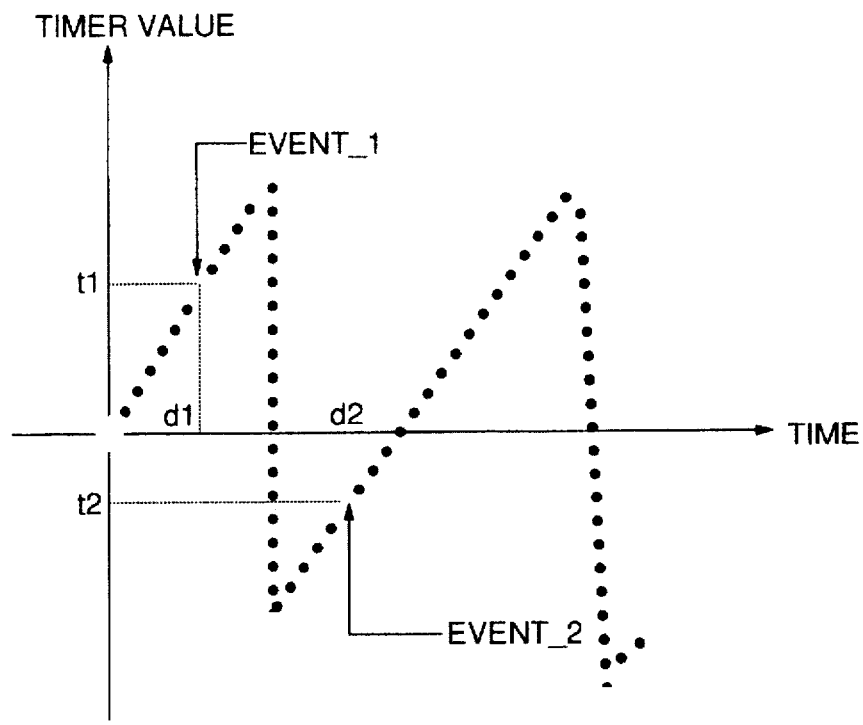
FIGS. 5 and 7 are representations of the timer signal versus time.
Figure 4:
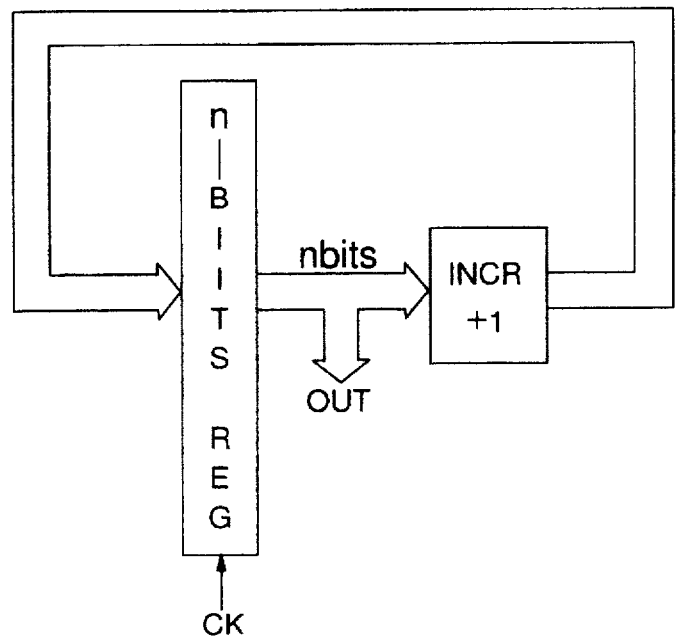
FIG. 4 is a schematic representation of a wraparound timer device.

FIG. 4 is a block diagram of such a counter, which is used in a preferred embodiment of the present invention. The counter includes a clocked n-bits long register with a feedback loop including a +1 incrementer. The output is a binary number which increases linearly until the counter maximum is reached. The next count drives the counter to its minimum value; that is, the counter "wraps around" and begins a new counting cycle. In the preferred embodiment of this invention, n=32 and the counter provides binary numbers varying as represented in FIG. 5. The counter output is "shifted" in a negative direction so that the counter wraps to a negative number and any count less than one half of the maximum counter excursion is interpreted as a negative value. Amounts greater than one half the maximum counter excursion are interpreted as positive values.

The fact that the timer wraps-around can introduce an ambiguity into the relationship between two timer values (t1 and t2) and the corresponding dates (d1 and d2); that is the larger of two timer values does not necessarily represent the more recent of two events.

Figure 6:
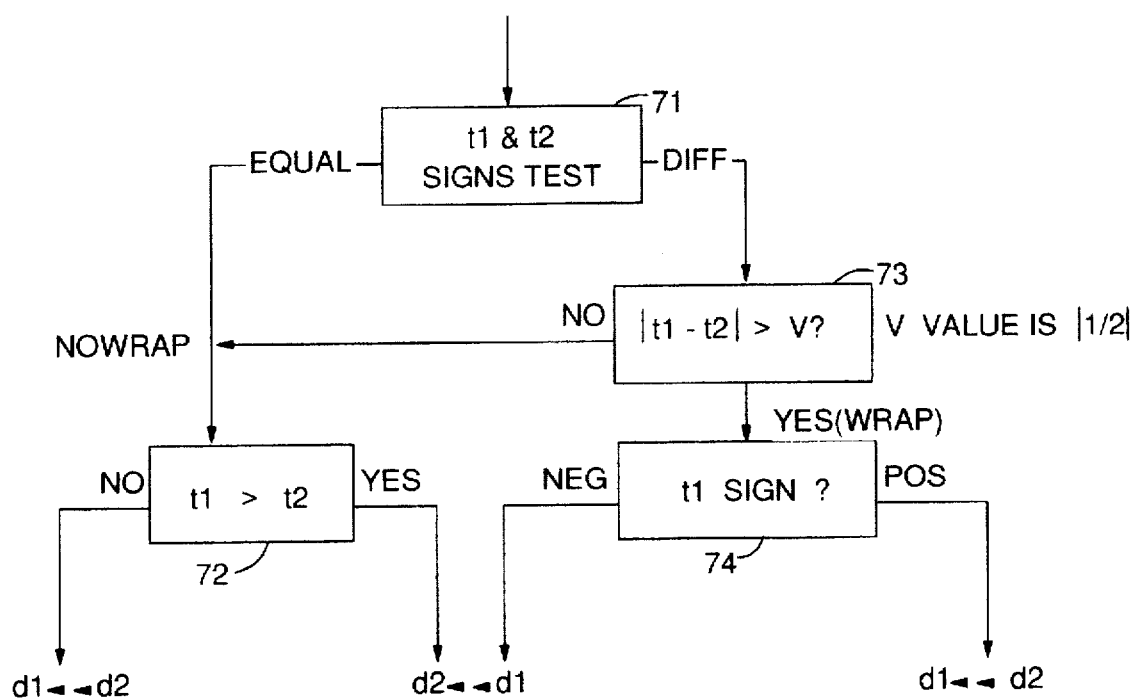
FIG. 6 is a flowchart of a simple process for performing time discriminations.

Assume t1 and t2 are close to each other as compared to the timer maximum value (i.e. timer cycle). A flowchart for a known method of comparing d1 and d2 is shown in FIG. 6. First, the t1 and t2 algebraic signs are compared (step 71). Should both signs be the same, then t1 and t2 magnitudes are compared (step 72). If t1>t2, then d2 is older than d1; otherwise d1 is older than d2. If t1 and t2 algebraic signs are different, the absolute magnitude |t1−t2| is compared to the magnitude V of T/2 (T being the timer period) (step 73). If |t1−t2|<V then the process goes to step 72 and proceeds as mentioned above. Otherwise the sign of t1 is tested (step 74). If this sign is negative, d2 is older than d1. If the sign is positive, d1 is older than d2.

The above described flowchart may be implemented by the following program:

|        |                     | /* t1 in R1, t2 in R2                  |
|--------|---------------------|----------------------------------------|
|        | MOVE R1 into R3;    | /* move t1 in R3 work reg              |
|        | XOR R2,R3 into R3;  | /* COMPARE t1,t2 SIGNS                 |
|        | TEST R3;            | /* Test R3 sign bit (bit 0)            |
|        | GOTO noBITO,nowrap; | /* Branch if bit0=0 (same sign)        |
|        | MOVE R1 into R3;    | /* move t1 in R3 work reg              |
|        | SUB R1,R3 into R3;  | /* compute /t1−t2/                     |
|        | NOP                 | /* wait for sign indicator             |
|        | GOTO notS,pos;      | /* positive if sign=0                  |
|        | SUB 0,R3 into R3;   | /* invert R3 since negative POS        |
| SUB    | R3,V into R3;       | /* Compare V value                     |
|        | NOP                 | /* wait for sign of result             |
|        | GOTO noS,WRAP;      | /* timer wrap if sign=0                |
| NOWRAP | SUB R1,R2 into ALU; | /* compare t1 and t2                   |
|        | NOP                 | /* wait for sign of result             |
|        | GOTO S,D1D2;        | /* sign=1, EVENT 1 came first          |
|        | GOTO D2D1;          | /* sign=0, EVENT 2 came first          |
| WRAP   | MOVE R1 into ALU;   | /* test t1 sign (bit0)                 |
|        | GOTO noB0,D1D2;     | /* sign=0, EVENT 1 came first          |
|        | GOTO D2D1;          | /* sign=1, EVENT 2 came first          |

The performance of applications requiring many date comparisons, such as leaky bucket operation within a high-speed data transmission network, may, therefore, be severely degraded by timer wrap-around effects, and a more efficient method for discriminating between two dates is needed.

The method proposed in this invention, consists in first executing an operation which sets an indicator herein designated as an "X indicator", and then, performing a simple test on the indicator. As noted earlier, it is assumed one is interested in comparing two dates close to each other as compared to the maximum timer value (i.e. timer cycle).

Figure 7:
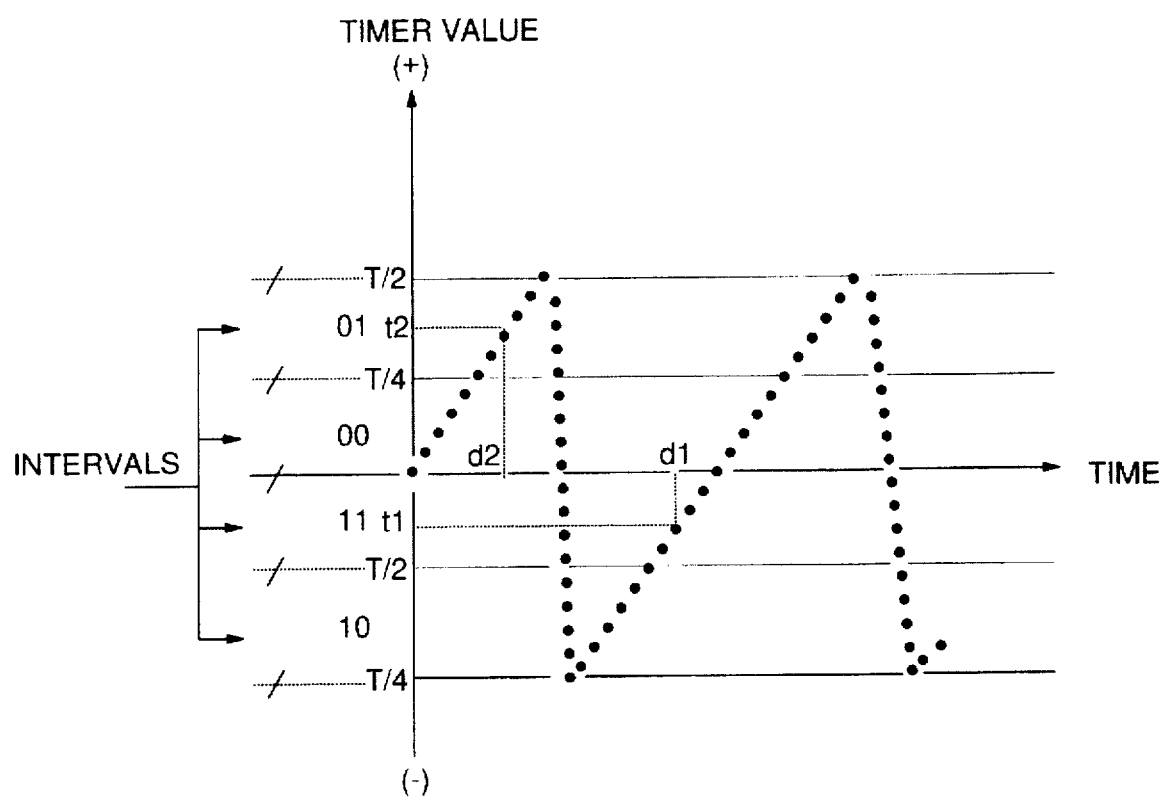

A practical way to implement the invention consists in considering four timer intervals for the whole timer excursion (i.e. swing), as shown in FIG. 7. These 4 intervals are defined by the two most significant bits of the timer value. For timer values assumed to be represented by signed binary numbers such as, for instance, signed 2's-complement binary numbers as this is the case for the preferred embodiment of this invention:

interval 10 corresponds to the most negative value range
interval 11 corresponds to the next negative interval
interval 00 corresponds to the first positive interval
interval 01 corresponds to the most positive interval The following pairs of intervals are considered as adjacent intervals for this invention:

10 and 11
11 and 00
00 and 01
01 and 10

Figure 8:
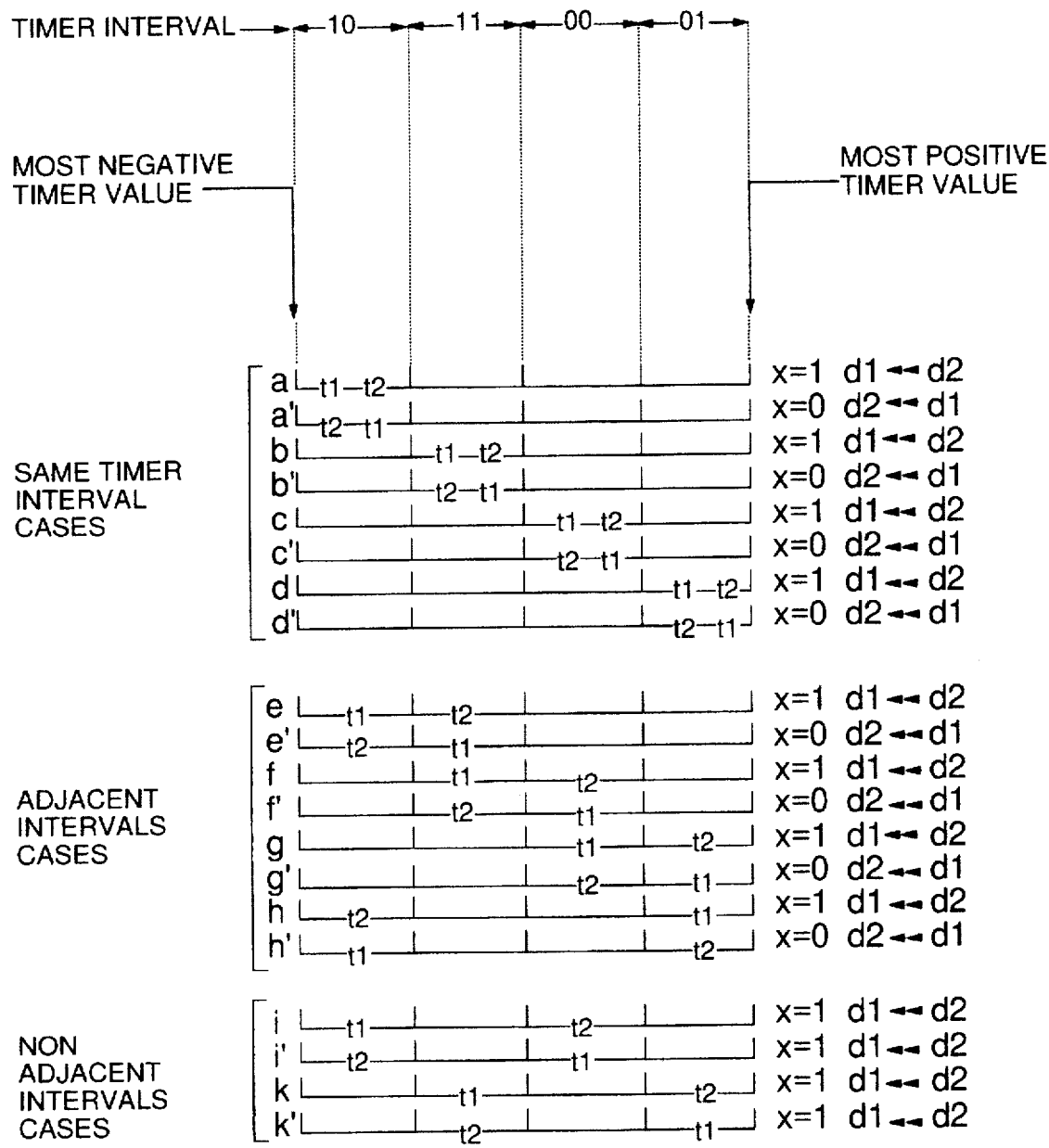
FIG. 8 is a representation of a parameter truth table implemented by the present invention.

If we assume a substract operation SUB (R1,R2) with a first register R1 containing the timer value t1 expressed as a binary number A in a 2's-complement form and a second register R2 containing the timer value t2 expressed as a binary number B in a 2's-complement form, the special X indicator associated with the subtract operation is generated as shown in the truth table of FIG. 8.

Figure 9:
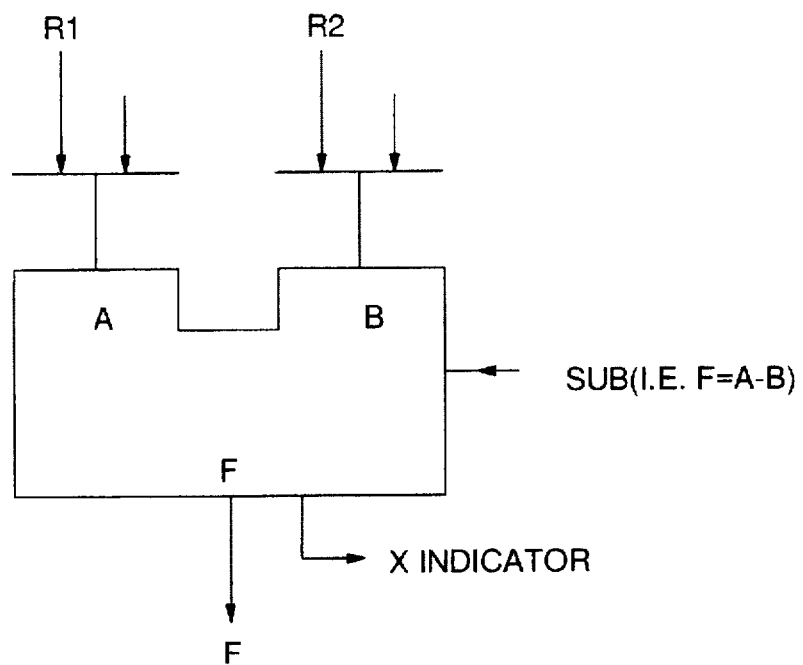
FIG. 9 is a schematic representation of ALU (Arithmetic Logic Unit) operation for implementing the present invention.

In the preferred embodiment, the generation of the X indicator is the result of Arithmetic and Logic Unit (ALU) operation SUB (R1, R2). It is assumed that a conventional ALU is used, which is able to perform a subtract operation on two operands, i.e. the two 2's-complement binary numbers A and B representing t1 and t2 respectively. The R1 and R2 ALU input registers respectively contain the A and B values. The R1 and R2 contents are gated to the ALU inputs and the ALU yields result F=A−B. (See FIG. 9), as well as providing the X indicator value as indicated hereunder.

The generation of the X indicator is detailed hereafter, with reference to cases a, a', . . . , h, h' of the truth table of FIG. 8.

If the ALU operands have the same signs i.e. Abit0 and Bbit0 are both equal to zero or both equal to one (cases a, a'; b, b'; c, c'; d, d'; e, e' and g, g'), then X=1 if the ALU result is negative (i.e. Fbit0=1).

If the ALU operands have opposite signs, i.e. Abit0 and Bbit0 are different, their second most significant bits are considered (i.e. Abit1 and Bbit1) according to the following cases:

Case 1 is where t1 belongs to interval 11 while t2 belongs to interval 00 (cases f, f') or where t1 belongs to interval 01 and t2 belongs to interval 10 (cases h, h'). In case 1, bit 1 of first operand (Abit1) is 1 and bit 1 of second operand (Bbit1) is 0.

Case 2 is where t1 belongs to interval 10 and t2 to interval 00 (case i) or the opposite (case i'). In case 2, Abit1 is 0 and Bbit1 is 0.

Case 3 is where t1 belongs to interval 11 and t2 belongs to interval 01 (case k) or the opposite (case k'). In case 3, Abit1 is 1 and Bbit1 is 1.

In all cases in which the A and B operands have unequal signs, X=1 if Abit1 equals 1 or Bbit1 equals 0; Otherwise X=0.

Figure 10:
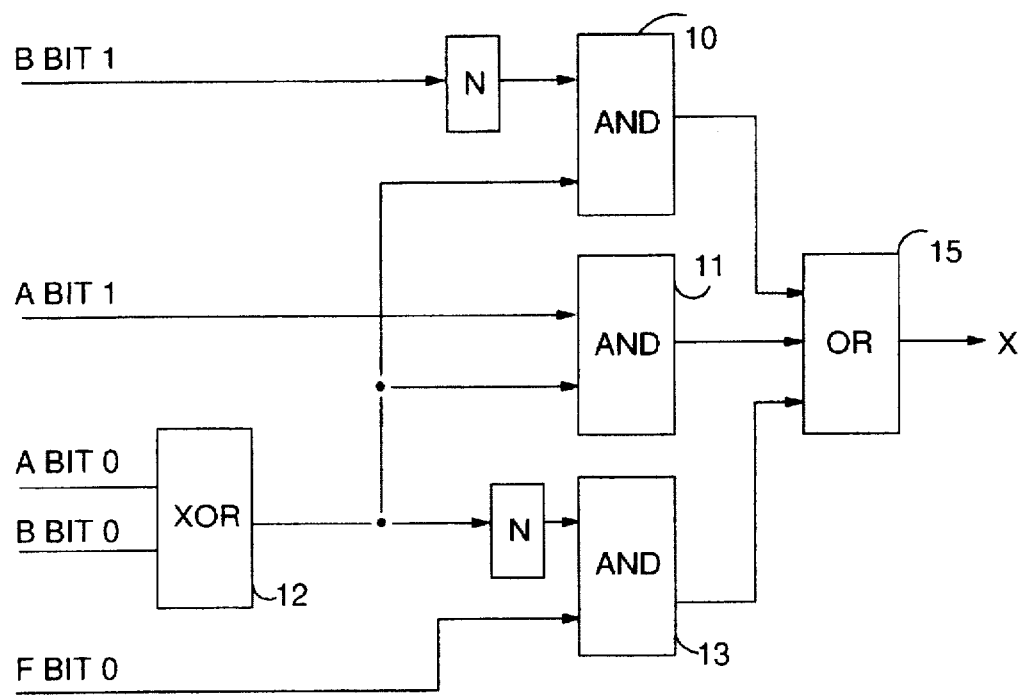
FIG. 10 is a schematic representation of a hardware device for implementing the present invention.

The generation of the X indicator is summarized in the logic block diagram of FIG. 10. It is to be noted that the logic needed for this function is quite simple. The B bit 1 (i.e. Bbit1 in the logic expression) is fed into a first AND gate 10) through an inverter circuit N, while A bit 1 (expressed as Abit1 in the logic expression) is fed into a second AND gate (11) directly. A bit zero and B bit zero (respectively referenced as Abit0 and Bbit0 in the logic expressions) are exclusive OR'ed into a XOR circuit (12), the output of which is fed into a third AND gate (13) through another inverter N, as well as directly into the second input of AND gates 10 and 11. The second imput to AND gate (13) is provided by F bit zero (i.e.:Fbit0). Finally, the outputs of AND gates (10, 11 and 13) are ORed (15) to provide the X bit indicator.

The operations performed by the logic elements shown in FIG. 10 can be expressed mathematically. In the following, the symbol "o", represents a logical AND operation, the symbol "+" represents a logical OR operation and the symbol "⊕" represents an Exclusive Or or XOR operation.

The logic uses an Exclusive Or of Abit0 and Bbit0 several times, which would be expressed mathematically as Abit0 ⊕ Bbit0. To simplify the mathematical representations, Abit0 ⊕ Bbit0 witll be written as C. Using this substitution, the representation for the logic operations is:

$$X = (\overline{C} \circ Fbit0) + (C \circ Abit1) + (\overline{C \circ Bbit1})$$

Figure 11:
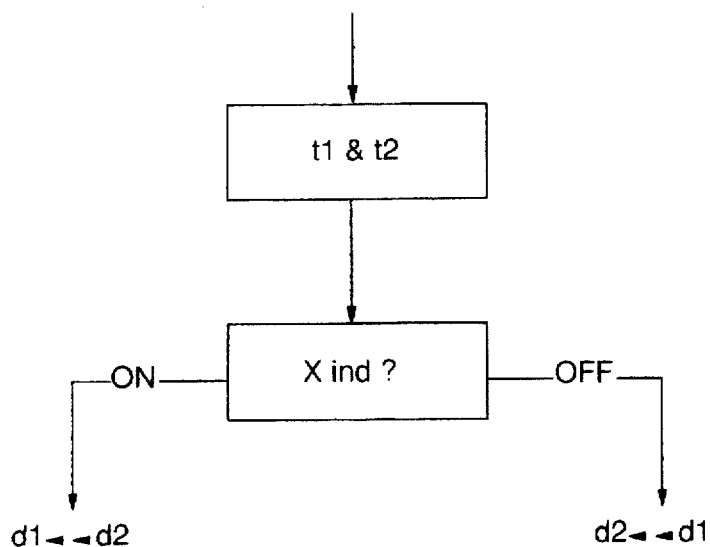
FIG. 11 is a flowchart of a process for implementing the present invention.

Finally, the relative occurrence of events can be established very simply by using the algorithm of FIG. 11 implemented by the very short following programm:

```
SUB      R1,R2 into alu ;    /* t1 in R1, t2 in R2
                             /* compare t1 and t2
NOP                          /* wait for X indicator
GOTO     X, D1D2 ;           /* X=1, EVENT 1 came first
GOTO     D2D1 ;              /* X=0, EVENT 2 came first
```

While there has been described what is considered to be a preferred embodiment of the present invention, variations and modifications in the preferred embodiment may occur to those skilled in the art once they become aware of the inventive concepts. Therefore, it is intended that the appended claims shall be construed to include not only the preferred embodiment but all such variations and modifications as fall within the true spirit and scope of the invention.

What is claimed is:

1. For use in a system including a timer, comprising a free running n-bit wraparound counter having a finite timer period, said timer counting from a maximum negative value having a predetermined absolute value to a maximum positive value having the same predetermined absolute value, and wherein the time of of an event is recorded as the current count in said timer when the event occurred, a method of determining which of two events occurring within a single timer period was the earlier, said method comprising the steps of:

a) setting a first value A equal to the two most significant bits (MSBs) of a first timer count recorded when one of the two events occurred;

b) setting a second value B equal to the two MSBs of a second timer count recorded when the other of the events occurred;

c) setting a third value equal to binary 1 if the MSBs of A and B have the same binary value and if the MSB of the binary result of A minus B equals binary 1;

d) setting a fourth value equal to binary 1 if the MSBs of A and B have different binary values and the second MSB of A equals binary 1;

e) setting a fifth value equal to binary 1 if the MSBs of A an B have different binary values and the second MSB of B equals binary 0;

f) If any of the third, fourth and fifth values equals binary 1, designating one of the first and second timer counts as being the first to occur; and g) if none of the third, fourth and fifth values equals binary 1, designating the other of the first and second timer counts as being the first to occur.

2. A method as set forth in claim 1 wherein the timer period is divided into four equal intervals beginning with interval in which the maximum negative value occurs, the two most significant bits of the first interval being 10, the two most significant bits of the second interval being 11, the two most significant bits of the third interval being 00 and the two most significant bits of the fourth interval being 01.

* * * * *